(12) United States Patent
Mitrovich

(10) Patent No.: US 8,550,128 B2
(45) Date of Patent: Oct. 8, 2013

(54) FLUID FLOW CONTROL VALVE WITH UPPER BLEED PORT AND SYSTEM

(71) Applicant: Michael J. Mitrovich, Kenmore, WA (US)

(72) Inventor: Michael J. Mitrovich, Kenmore, WA (US)

(*) Notice: Subject to any disclaimer, the term of this patent is extended or adjusted under 35 U.S.C. 154(b) by 0 days.

(21) Appl. No.: 13/644,086

(22) Filed: Oct. 3, 2012

(65) Prior Publication Data

US 2013/0032248 A1 Feb. 7, 2013

Related U.S. Application Data

(63) Continuation-in-part of application No. 12/485,646, filed on Jun. 16, 2009, now Pat. No. 8,281,823.

(60) Provisional application No. 61/542,348, filed on Oct. 3, 2011, provisional application No. 61/061,922, filed on Jun. 16, 2008.

(51) Int. Cl.
*B65B 3/26* (2006.01)
*F16K 31/18* (2006.01)

(52) U.S. Cl.
USPC ........... 141/198; 141/303; 141/350; 137/413; 220/86.2

(58) Field of Classification Search
USPC .............. 141/198, 83, 192, 301–303, 350; 137/391, 398, 409, 202, 413; 220/86.2, 220/86.3
See application file for complete search history.

(56) References Cited

U.S. PATENT DOCUMENTS

| | | |
|---|---|---|
| 751,096 A | 4/1904 | Nethry |
| 993,628 A | 5/1911 | Williams |
| 1,302,538 A | 5/1919 | Gulick |
| 1,525,247 A | 2/1925 | Leiss |
| 1,555,755 A | 9/1925 | Pratt |
| 1,676,084 A | 7/1928 | Flagg |
| 1,694,072 A | 12/1928 | Manion |
| 1,788,827 A | 1/1931 | Ferrin |
| 1,826,088 A | 10/1931 | Ostlind |
| 2,092,670 A | 9/1937 | Hess |
| 2,477,186 A | 7/1949 | Koehler |
| 2,825,526 A | 3/1958 | Zuiderhoek |
| 3,269,404 A | 8/1966 | Lebow |
| 3,907,248 A | 9/1975 | Coulbeck |
| 3,929,155 A | 12/1975 | Garretson |

(Continued)

FOREIGN PATENT DOCUMENTS

| | | |
|---|---|---|
| EP | 144549 | 6/1985 |
| EP | 0144549 A1 | 6/1985 |

(Continued)

OTHER PUBLICATIONS

International Search Report and Written Opinion, PCT/US2012/058783, dated Mar. 21, 2013.

(Continued)

*Primary Examiner* — Timothy L Maust
*Assistant Examiner* — Timothy P Kelly
(74) *Attorney, Agent, or Firm* — Buchanan Nipper

(57) ABSTRACT

A refilling system for use in refilling a container with a fluid from a fluid source. The container having air space above a fluid space. The fluid having a fluid level within the container. The refilling system comprising a fluid flow control valve connected via a bleed line to a fluid level sensor.

20 Claims, 5 Drawing Sheets

(56) References Cited

U.S. PATENT DOCUMENTS

| | | |
|---|---|---|
| 4,064,907 A | 12/1977 | Billington |
| 4,292,996 A | 10/1981 | Pataki et al. |
| 4,305,422 A | 12/1981 | Bannink |
| 4,313,459 A | 2/1982 | Mylander |
| 4,770,317 A | 9/1988 | Podgers et al. |
| 5,002,154 A | 3/1991 | Chen |
| 5,027,871 A | 7/1991 | Guenther |
| 5,282,496 A | 2/1994 | Kerger |
| 5,454,421 A | 10/1995 | Kerger |
| 5,460,197 A | 10/1995 | Kerger |
| 5,487,404 A | 1/1996 | Kerger |
| 5,642,752 A | 7/1997 | Yokota |
| 5,649,577 A | 7/1997 | Farkas |
| 5,787,942 A | 8/1998 | Preston |
| 5,813,432 A | 9/1998 | Elsdon |
| 5,829,465 A | 11/1998 | Garretson |
| 5,832,953 A | 11/1998 | Lattner |
| 5,842,500 A | 12/1998 | Rockwood |
| 5,887,609 A | 3/1999 | Garretson |
| 5,921,272 A | 7/1999 | Cavagna |
| 5,954,101 A | 9/1999 | Drube |
| 5,992,445 A | 11/1999 | Pagani |
| 6,026,841 A | 2/2000 | Kozik |
| D421,788 S | 3/2000 | Kingman |
| 6,035,888 A | 3/2000 | Gil |
| 6,076,546 A | 6/2000 | Waters |
| 6,079,438 A | 6/2000 | Cavagna |
| 6,109,314 A | 8/2000 | Christophe |
| 6,138,709 A | 10/2000 | Home |
| 6,178,994 B1 | 1/2001 | Park |
| 6,227,233 B1 | 5/2001 | Kozik |
| 6,230,730 B1 | 5/2001 | Garretson |
| 6,247,492 B1 | 6/2001 | Stuart |
| 6,257,287 B1 | 7/2001 | Kippe |
| 6,263,905 B1 | 7/2001 | Yokota |
| 6,293,302 B1 | 9/2001 | Waters |
| 6,311,723 B1 | 11/2001 | Shipp |
| 6,318,421 B1 | 11/2001 | Lagache |
| 6,408,869 B1 | 6/2002 | Bartos |
| 6,415,813 B1 | 7/2002 | Kraft |
| 6,450,196 B1 | 9/2002 | Bartos |
| 6,536,465 B2 | 3/2003 | David et al. |
| 6,557,579 B2 | 5/2003 | Kozik |
| 6,640,829 B1 | 11/2003 | Kerger |
| 6,810,905 B1 | 11/2004 | Watson |
| 6,874,528 B2 | 4/2005 | Kozik |
| 6,910,499 B2 | 6/2005 | Chan |
| 7,089,974 B2 | 8/2006 | Stuart |
| D559,358 S | 1/2008 | Moura de Oliveira |
| 7,584,766 B2 | 9/2009 | David et al. |
| 7,793,682 B2 | 9/2010 | Smit |
| 7,891,373 B2 | 2/2011 | Workman et al. |
| 8,025,076 B2 | 9/2011 | Smit |
| 8,402,994 B2 * | 3/2013 | Smit .................. 137/391 |
| 8,430,117 B2 * | 4/2013 | Mitrovich .......... 137/413 |

FOREIGN PATENT DOCUMENTS

| | | |
|---|---|---|
| GB | 1153381 | 5/1969 |
| GB | 1193007 | 5/1970 |
| GB | 1335188 | 10/1973 |
| GB | 1440107 | 6/1976 |
| GB | 1541110 | 2/1979 |
| GB | 2317382 | 3/1998 |
| GB | 2317382 A | 3/1998 |
| SU | 492859 A1 | 11/1975 |
| SU | 1188706 A1 | 10/1985 |
| SU | 1264145 A1 | 10/1986 |

OTHER PUBLICATIONS

Pursuant to MPEP § 2001.6(b) Applicant brings the following co-pending applications to the Examiner's attention: U.S. Appl. No. 12/767,310, U.S. Appl. No. 13/183,905, and U.S. Appl. No. 13/644,713.

* cited by examiner

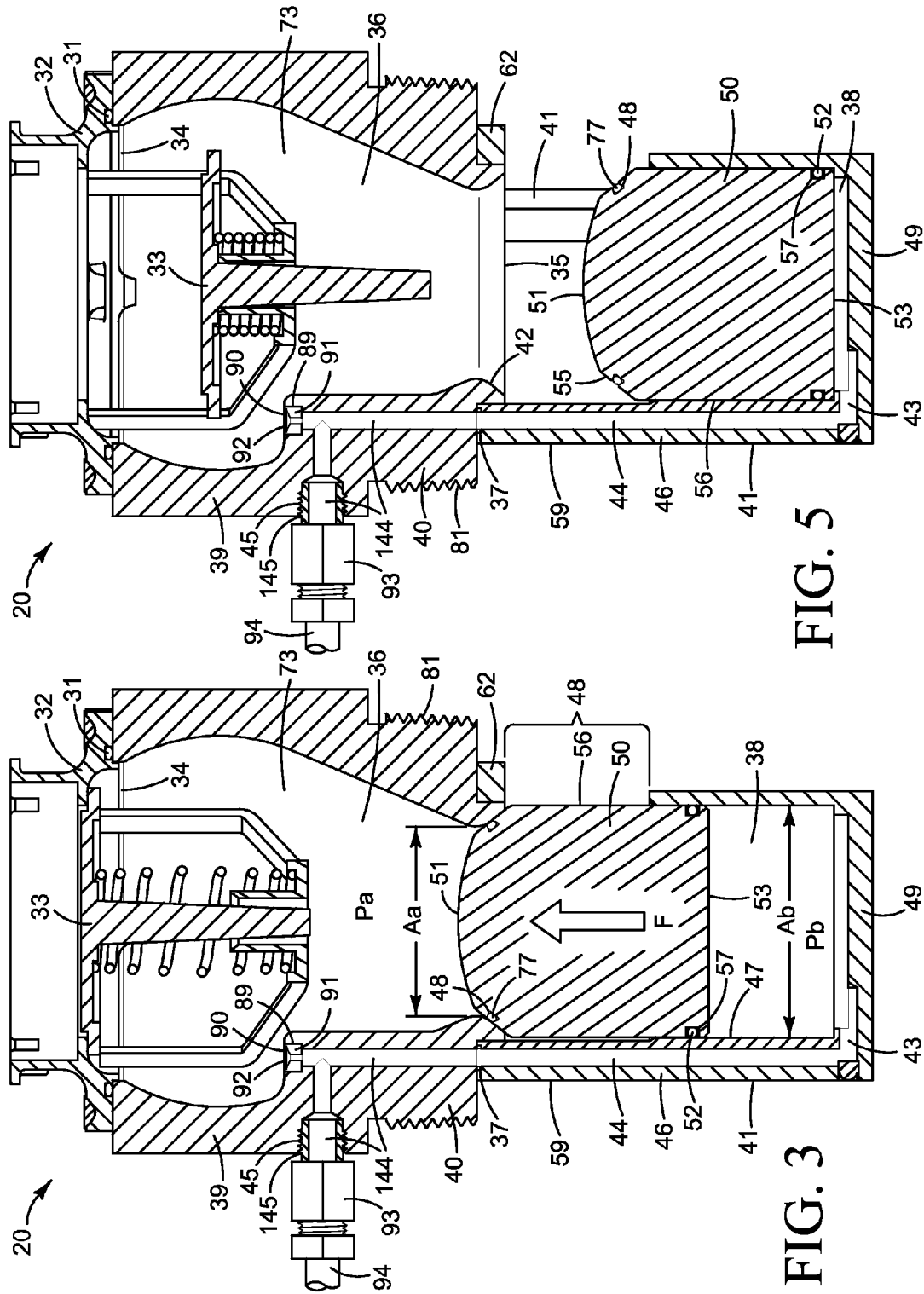

FLUID FLOW CONTROL VALVE WITH UPPER BLEED PORT AND SYSTEM

PRIORITY/CROSS-REFERENCE TO RELATED APPLICATIONS

This application claims the benefit of U.S. Provisional Application No. 61/542,348, filed 13 Oct. 2011, the disclosure of which is incorporated by reference. This application is also a continuation-in-part application of application Ser. No. 12/485,646, filed 16 Jun. 2009, which was a non-provisional of application Ser. No. 61/061,922, filed 16 Jun. 2008, the disclosures of which are incorporated herein by reference.

TECHNICAL FIELD

The disclosure generally relates to valves and refilling systems. Particular embodiments relate to fluid flow control valves utilized with refueling apparatuses for automatically stopping fluid flow when a desired level of fluid in a container is attained.

BACKGROUND

A variety of applications require the ability to rapidly fill a container with a fluid. To accomplish this rapid filling, the fluid is typically pumped (under pressure) into the container. Due to this rapid filling, such applications typically include means for quickly shutting off the flow of fluid when the container reaches a predetermined level of fluid held therein so as to prevent overfilling and/or spillage of the fluid.

SUMMARY OF THE DISCLOSURE

Several exemplary refilling systems for use in refilling a container with a fluid from a fluid source, the container having air space above a fluid space, and the fluid having a fluid level within the container, are described herein.

An exemplary refilling system comprises a fluid flow control valve. The fluid flow control valve comprises a piston, a fluid source connector, an upper portion, a lower portion, an upper bleed port, a lower bleed port, an inlet port, a bleed passage, and at least one lateral fluid flow passage. The fluid source connector connects the fluid source to an upper portion inlet orifice.

The upper portion comprises the inlet orifice, an outlet orifice defining a seat, and a first chamber defined between the inlet orifice and the outlet orifice. The piston has a head configured for mating engagement with the seat. The piston is movable from a closed position where the head engages the seat thereby closing the outlet orifice, to an open position where the head is not engaged with the seat thereby opening the outlet orifice.

The lower portion comprises a housing configured for receiving the piston therein. The housing has an internal sidewall that defines an open topped cylinder having an end wall. The piston is slidably received within the cylinder. The space within the cylinder between the end wall and the piston defines a second chamber.

The lower portion further comprises a lower bleed port. The inlet port is defined in the fluid flow control valve. The bleed passage extends from the inlet port to the lower bleed port. The bleed passage further extends to an upper bleed port. The lower bleed port is fluidly connected to the second chamber. The upper bleed port fluidly connects to the first chamber. The at least one lateral fluid flow passage is defined in the internal sidewall, and is for allowing fluid passing through the fluid flow control valve to be conveyed into the container. When the head seals against the seat, the at least one lateral fluid flow passage is closed.

Preferably, the head comprises a beveled edge for sealing engagement with the seat. Preferably, either the lower bleed port is defined through the end wall and fluidly connects to the second chamber. Preferably, the refilling system further comprises a bleed line for fluidly connecting the inlet port with a fluid level sensor.

Preferably, the fluid level sensor has an open position whereby, when the fluid source connector connects the fluid source to the upper portion inlet orifice, fluid can flow from the fluid flow control valve, through the bleed line, and through the fluid level sensor. A fluid pressure difference between the first chamber and the second chamber moves the piston away from the seat, allowing the fluid to flow from the fluid source, through the inlet orifice, through the outlet orifice, through the lateral fluid flow passages and into the container.

Preferably, the fluid level sensor has a closed position whereby, when the fluid source connector connects the fluid source to the upper portion inlet orifice, fluid is prevented from flowing from the fluid flow control valve, through the bleed line, and through the fluid level sensor. A fluid pressure difference between the first chamber and the second chamber moves the piston into sealing engagement with the seat, thereby blocking the flow of fluid from the fluid source, through the inlet orifice, through the outlet orifice, through the lateral fluid flow passages and into the container.

Another exemplary refilling system comprises a fluid flow control valve comprising a piston, a fluid source connector, an upper portion, a lower portion, an upper bleed port, a lower bleed port, an inlet port, a bleed passage, and at least one lateral fluid flow passage. The fluid source connector connects the fluid source to an upper portion inlet orifice. The upper portion comprises the inlet orifice, an outlet orifice defining a seat, and a first chamber defined between the inlet orifice and the outlet orifice. The piston has a head which is configured for mating engagement with the seat. The piston is movable from a closed position where the head engages the seat thereby closing the outlet orifice, to an open position where the head is not engaged with the seat thereby opening the outlet orifice.

The lower portion comprises a housing configured for receiving the piston therein. The housing has an internal sidewall that defines an open topped cylinder having an end wall. The piston is slidably received within the cylinder. The space within the cylinder between the end wall and the piston defines a second chamber. The lower portion further comprises a lower bleed port defined through the end wall.

The inlet port is defined in the fluid flow control valve. The bleed passage extends from the inlet port to the lower bleed port. The bleed passage further extends to an upper bleed port. The lower bleed port is fluidly connected to the second chamber. The upper bleed port is fluidly connected to the first chamber. The at least one lateral fluid flow passage is defined in the internal sidewall, and is for allowing fluid passing through the fluid flow control valve to be conveyed into the container. The head sealing against the seat closes the at least one lateral fluid flow passage.

Optionally, the head comprises a beveled edge for sealing engagement with the seat. Optionally, a bleed line fluidly connects the inlet port with a fluid level sensor.

Optionally, the fluid level sensor has an open position whereby, when the fluid source connector connects the fluid source to the upper portion inlet orifice, fluid can flow from the fluid flow control valve, through the bleed line, and through the fluid level sensor. A fluid pressure difference between the first chamber and the second chamber moves the piston away from the seat, allowing the fluid to flow from the fluid source, through the inlet orifice, through the outlet orifice, through the lateral fluid flow passages and into the container.

Additional understanding of the devices and methods contemplated and/or claimed by the inventor(s) can be gained by reviewing the detailed description of exemplary devices and methods, presented below, and the referenced drawings.

BRIEF DESCRIPTION OF THE DRAWINGS

FIG. 3 is a cross-sectional, side view of the first exemplary fluid flow control valve of FIG. 2, illustrated in its closed position.

FIG. 5 is a cross-sectional, side view of the first exemplary fluid flow control valve of FIG. 2, illustrated in its open position.

DESCRIPTION OF THE PREFERRED EMBODIMENTS

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," and "or" and grammatically related terms indicates non-exclusive alternatives without limitation, unless otherwise noted. The use of "including" and grammatically related terms means "including, but not limited to," unless otherwise noted. The use of the articles "a," "an" and "the" are meant to be interpreted as referring to the singular as well as the plural, unless the context clearly dictates otherwise. Thus, for example, reference to "a passage" includes two or more such passages, and the like. The use of "exemplary" means "an example of" and is not intended to convey a meaning of an ideal or preferred embodiment.

Figure 1:
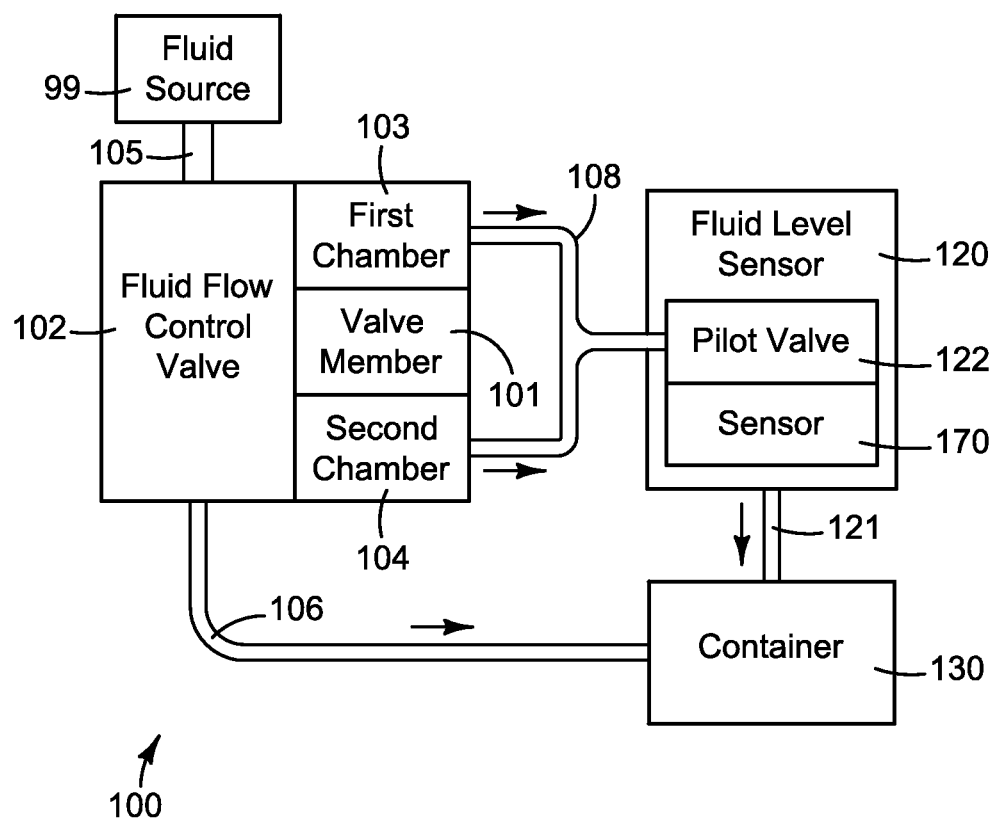
FIG. 1 is a schematic representation of a first exemplary refilling system.

Referring initially to FIG. 1, illustrated is a schematic representation of a first exemplary refilling system 100. The system 100 comprising a fluid flow control valve 102 and a fluid level sensor 120. The fluid flow control valve 102 having a first chamber 103, a second chamber 104, and a valve member 101 able to be opened and closed, separating the first chamber 103 from the second chamber 104. The fluid flow control valve 102 connecting via an inlet 105 to a fluid source 99, and via an outlet 106 to a container 130. The first chamber 103 and/or the second chamber 104 for supplying pressure, via a pressure line 108, to the fluid level sensor 120. It is preferred that the pressure line 108 be unregulated.

The pressure line 108 for supplying a flow of bleed fluid from the fluid flow control valve 102, through a passageway through the fluid level sensor 120, and into a container 130 via an outlet 121. The fluid level sensor 120 having a pilot valve 122 which interrupts the pilot valve passageway. The fluid level sensor 120 further comprises a sensor 170 for sensing the fluid level in the container 130.

When the sensor 170 senses that the fluid level 8 in the container 130 is below a predetermined level, the sensor 170 opens the pilot valve 122. When the pilot valve 122 is open, a flow of bleed fluid (if present) from the pressure line 108 and into the container 130 is possible. The flow of bleed fluid through the pressure line 108 results in the valve member 101 of the fluid flow control valve 102 opening, allowing fluid to flow from the fluid source 99, through inlet 105, through the fluid flow control valve 102, out the outlet 106, and into the container 130.

When the sensor 170 senses that the fluid level 8 in the container 130 is at or above a predetermined level, the sensor 170 closes the pilot valve 122, resulting in the pilot valve 122 cutting off the flow of bleed fluid into the container 130. When the flow of bleed fluid into the container 130 is stopped, the valve member 101 of the fluid flow control valve 102 closes, preventing fluid from flowing from the fluid source 99 through inlet 105, through the fluid flow control valve 102, out the outlet 106, and into the container 130.

FIGS. 2 through 7 illustrate a second exemplary refilling system 10, comprising a pilot-operated fluid flow control valve 20 and a fluid level sensor 70. The fluid level sensor 70 further comprising a pilot valve 22 and a sensor 80. The fluid flow control valve 20 is illustrated as being installed on a container 6 within the second exemplary refilling system 10. The fluid flow control valve 20 for interrupting the flow of fluid from the fluid source (not illustrated) into the container 6. The fluid flow control valve 20 having an open position whereby fluid can flow from the fluid source into the container 6, and a closed position whereby fluid is prevented from flowing from the fluid source into the container 6.

One exemplary container 6 is a fuel tank for a vehicle or other machinery (e.g., locomotives, automobiles, large tracked excavators, cranes, farm equipment, industrial equipment). Other exemplary containers include, but are not limited to fluid storage vessels, storage tanks, and freight railcars for hauling liquids (e.g., fuel, oil, natural gas, ethanol, chemicals, food stuff (e.g., milk, corn syrup), water).

The container 6 having an air space above a fluid space when fluid is present in the container 6. The surface of the fluid space defines a fluid level 8 within the container 6. Based upon a higher fluid level 8 in the container 6, as sensed by the fluid level sensor 70, the fluid flow control valve 20 can be closed, thereby shutting off a flow of fluid from a fluid source through the fluid flow control valve 20 and into the container 6. Likewise, based upon a lower fluid level 8 in the container 6, as sensed by the fluid level sensor 70, the fluid flow control valve 20 can be opened, thereby permitting a flow of fluid from a fluid source (if present) to flow through the fluid flow control valve 20 and into the container 6.

The fluid flow control valve 20 comprises a fluid source connector 32 (e.g., dry disconnect receptacle), a poppet valve assembly 33, a valve body portion 40 comprises an upper portion 39 and a lower portion 41, and a piston 50. The fluid source connector 32 of the fluid flow control valve 20 configured for connecting with a fluid source. Any suitable structure can be used for the connection, and a skilled artisan will be able to select an appropriate structure for the connection in a particular embodiment based on various considerations, including the intended use of the fluid flow control valve 20, the intended environment within which the fluid flow control valve 20 will be used, and the equipment and/or accessories with which the fluid flow control valve 20 is intended to be used, among other considerations.

The fluid level sensor 70 senses the fluid level 8 in the container 6. In the second exemplary refilling system 10, the fluid level sensor 70 comprises a sensor 80. The sensor 80 illustrated in FIG. 2 comprises a float valve assembly. One example of a suitable float valve assembly can be found in U.S. application Ser. No. 12/767,310, the disclosure of which is incorporated herein by reference. While FIG. 2 illustrates the sensor 80 as a float valve assembly, other types of sensors (e.g., optical sensors, pressure sensors) would likewise be suitable, and a skilled artisan will be able to select an appropriate sensor in a particular embodiment based on various considerations, including the intended use of the fluid level sensor, the intended arena within which the fluid level sensor will be used, and the equipment and/or accessories with which the fluid level sensor is intended to be used, among other considerations.

Figure 2:
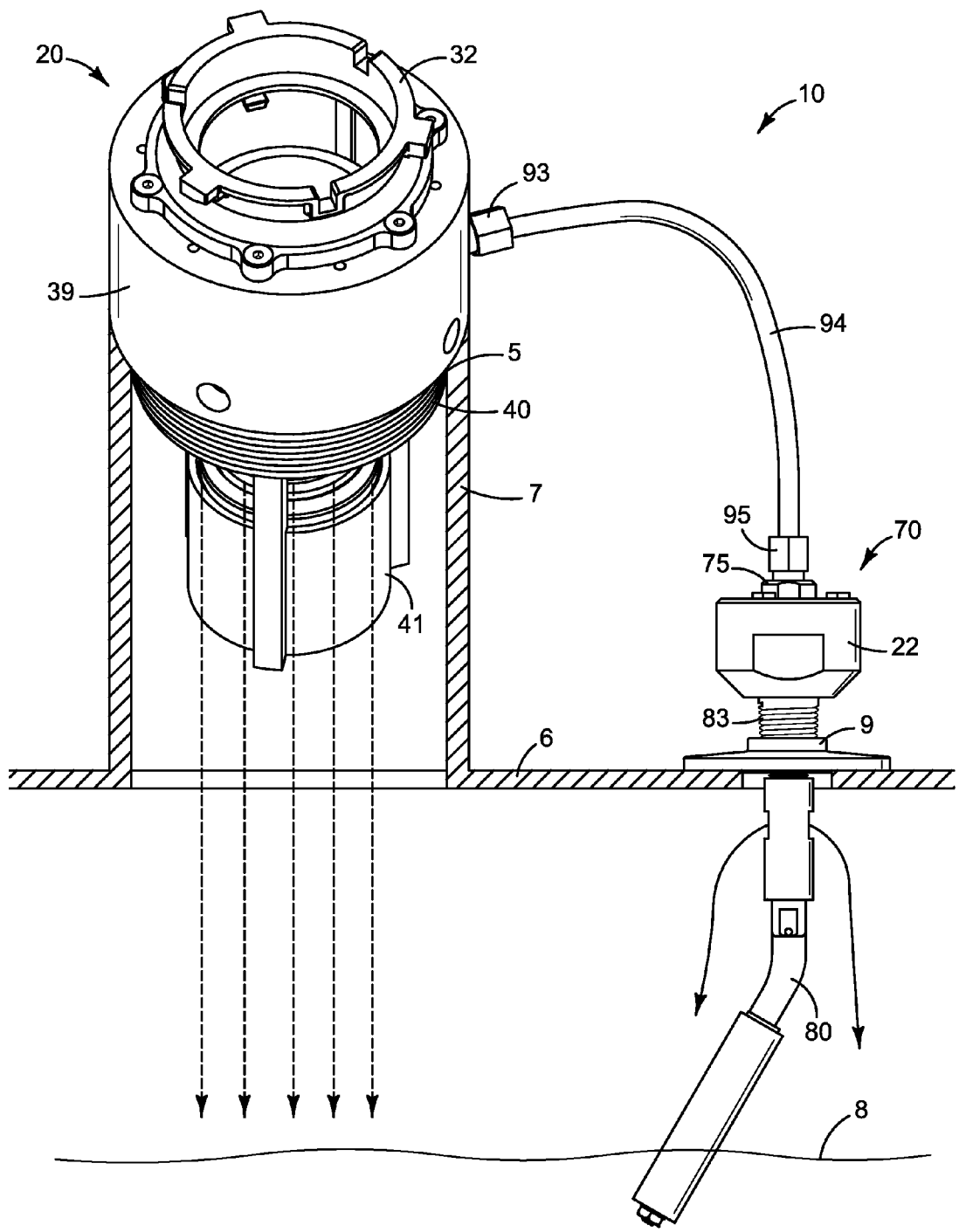
FIG. 2 is a side perspective view of a first exemplary fluid flow control valve, illustrated installed on a container within a refilling system.

As illustrated in FIG. 2, the fluid level sensor 70 comprises a pilot valve 22 and a sensor 80. The pilot valve 22 is illustrated as being mounted on the top surface of the container 6, with the sensor 80 portion extending downwards through a port 9 into the container 6. In other exemplary refilling systems, the pilot valve 22 could be installed inside the container 6 with the sensor 80 portion.

In the exemplary fluid flow control valve 20 illustrated in FIGS. 2 through 7, the fluid source connector 32 comprises a dry disconnect receptacle for connecting with dry disconnect coupler (not illustrated) connected to the fluid source (not illustrated). The fluid source connector 32 configured for mating with the dry disconnect coupler (not illustrated). A single point dry break coupler is preferred, with API style dry break couplers likewise being useful. The dry disconnect coupling allows a fluid conduit (not illustrated) connected to the fluid source (not illustrated) to be fluidly connected with the fluid flow control valve 20. The utilization of a dry disconnect coupling is well known in the prior art, for instance as illustrated in U.S. Pat. No. 6,155,294 to Cornford.

In operation of this exemplary fluid flow control valve 20, upon connecting the coupler to the fluid source connector 32, a lever (not illustrated) is engaged which causes a poppet valve in the coupler to force open the poppet valve assembly 33 of the fluid source connector 32 (or vice versa), as illustrated in FIG. 5, thereby allowing fluid to be transmitted from the fluid conduit, through the dry disconnect coupling and into the main fluid flow passageway of the fluid flow control valve 20. Upon disengagement of the lever, the poppet valve of the coupler moves away from the poppet valve assembly 33 of the fluid source connector 32 (or vice versa), allowing the receptacle's poppet valve assembly 33 to close, as illustrated in FIG. 3, thereby preventing spillage of fluid out of the receptacle after filling is complete (at disconnect).

As illustrated in FIGS. 3 and 5, the fluid source connector 32 of the fluid flow control valve 20 fluidly connects the valve body portion 40 at an inlet orifice 34. Sealing means 31, such as an O-ring, can be used to seal the connection. The valve body portion 40 comprises an upper portion 39 and a lower portion 41. In the exemplary fluid flow control valve 20 illustrated in FIGS. 2 through 7, the fluid source connector 32 connects to the upper portion 39 of the valve body portion 40 at the orifice 34 via a number of bolts 29. Any suitable connection means can be used for the connection, and a skilled artisan will be able to select an appropriate structure for the connection in a particular embodiment based on various considerations, including the intended use of the fluid flow control valve, the intended environment within which the fluid flow control valve will be used, and the equipment and/or accessories with which the fluid flow control valve is intended to be used, among other considerations.

The opposite end of the upper portion 39 comprises an outlet orifice 35 defining a seat 42. The seat 42 configured for mating engagement with a sealing face 55 of the head of a piston 50. It is preferred that the sealing face 55 be beveled. In other exemplary fluid flow control valves, the face may be planar, curved, or another shape.

In the exemplary fluid flow control valve 20 illustrated in FIGS. 2 through 7, the valve body portion 40 comprises external threads 81 configured for threading into a threaded hole within a wall of the container (preferably the top wall of the container, or, as illustrated in FIG. 2, into a threaded receiver 7 having a port 5 extending from the container 6). The threaded receiver 7 can comprise a pre-existing port into the container, such as a refilling port, or the port can be created for the purpose of utilization of an exemplary system/method. Other manners of mounting the fluid flow control valve 20 to the container 6 are likewise possible. Any suitable connection means can be used for the connection, and a skilled artisan will be able to select an appropriate structure for the connection in a particular embodiment based on various considerations, including the intended use of the fluid flow control valve, the intended environment within which the fluid flow control valve will be used, and the equipment and/or accessories with which the fluid flow control valve is intended to be used, among other considerations.

In one particular application, a locomotive's fuel tank (container) will has a one-half inch (½") to three-quarter inch (¾") National Pipe Thread (NPT) port 5 through the top wall of the container 6, extending from the outside of the container to the inside of the container. In some exemplary systems/methods, the port 5 is defined at a distal end of a threaded receiver 7. This port 5 is typically used as a vent tube and/or to connect the locomotive's fuel tank to the existing receiver using a flexible tube. The port 5 of the treaded receiver being internally threaded and configured for receiving the threaded portion 81 of the valve body portion 40.

It is preferred that the container 6 comprise a second port 9 defined through the container 6, extending from the outside of the container to the inside of the container. The second port 9 for allowing the sensor 80 portion of the fluid level sensor 70 to be inserted there-through and into the container 6. The second port 9 preferably comprising threading configured for receiving a threaded portion 83 of the fluid level sensor 70 there-through. It is preferred that the port 9 be located on a top side of the container 6, thereby enabling the sensor 80 to be installed generally vertically into the container 6. The second port 9 may likewise comprise a National Pipe Thread (NPT) port through the top wall of the container 6. While such an installation is preferred, a skilled artisan will be able to select an appropriate structure and installation location for the fluid level sensor 70 and/or sensor 80 in a particular embodiment based on various considerations, including the intended use of the refilling system 10, the intended arena within which the refilling system 10 will be used, and the equipment and/or accessories with which the refilling system 10 is intended to be used, among other considerations.

A first chamber 36 is defined within the upper portion 39 between the inlet orifice 34 and the outlet orifice 35. The fluid flow control valve 20 comprising an axial bleed port 45 fluidly connected to the first chamber 36 and the second chamber 38 via bleed passageway 44 and bleed passageway 144. The bleed passageway 44 and bleed passageway 144 fluidly connecting the first chamber 36 and the second chamber 38 to the axial bleed port 45. The axial bleed port 45 configured to receive an axial bleed port fitting 93 which, via a bleed line 94, fluidly connects to the fluid level sensor 70 at a distal bleed port 75 via a distal bleed port fitting 95.

The bleed line 94 fluidly extends between fluid flow control valve 20 and the fluid level sensor 70. The bleed line 94 has a first portion (e.g., a first end) extending to a second portion (e.g., second end). At the first portion, the bleed line 94 connects, via an axial bleed port fitting 93, to the axial bleed port 45 of the valve body portion 40 of the pilot-operated fluid flow control valve 20. The axial bleed port 45 defined through valve body portion 40, connecting with the bleed passageway 144. At the second portion, the bleed line 94 connects, via a distal bleed port fitting 95, to the distal bleed port 75 of the fluid level sensor 70. The distal bleed port 75 in fluid communication with passageway 63 defined through the fluid level sensor 70. The pilot valve 22 interrupting the passageway 63. The bleed line 94 thusly connected is able to transmit a bleed fluid supply from the first chamber 36 and/or second chamber 38 through the pilot valve 22 (when open) and into the container 6.

The bleed passage 144 is defined through the upper portion 39, extending from the inlet port 45 to the bleed passage 44 defined through the lower portion 41. In the embodiments illustrated in the Figures, the inlet port 45 extends through the upper portion 39. In other embodiments, the inlet port could extend through the lower portion, or other structure. This inlet port 45 configured for fluidly connecting, such as via the bleed line 94 illustrated in FIG. 2, to the fluid level sensor 70. Bleed passage 144 connects with bleed passage 44.

The bleed passage 144 further comprising an upper bleed port passageway 89 fluidly connected to the first chamber 36 at an upper bleed port 90. The upper bleed port passageway 89 allowing fluid to flow from the first chamber 36 and into the bleed passage 144. The upper bleed port passageway 89 fluidly connecting the first chamber 36 to the second chamber 38 via bleed passage 144 and bleed passage 44. It is preferred that the upper bleed port passageway 89 face into the flow of fluid from the fluid source through the first chamber 36, out the lateral fluid flow passage 61 and into the container 6.

In some exemplary fluid flow control valves, the upper bleed port passageway 89 comprises a screen 92 for preventing foreign objects from passing into (and potentially plugging) upper bleed port passageway 89 and/or the bleed passage 144.

In some exemplary fluid flow control valves, the upper bleed port passageway 89, comprises a piston jet insert 91 received into the upper bleed port passageway 89 through the upper bleed port 90 or otherwise fluidly connected thereto. The piston jet insert 91 for effectively allowing the diameter of the upper bleed port 90 to be modified for testing purposes. Alternatively, no piston jet insert 91 could be included, and desired flow could be created based upon the diameter of the upper bleed port 90 and/or upper bleed port passageway 89.

In the exemplary fluid flow control valve 20 illustrated in FIGS. 2 through 7, the bleed passage 144 is defined through the upper portion 39, and the bleed passage 144 configured to fluidly connect with a second bleed passage 44 defined through the lower portion 41, thereby defining at least one joint bleed passage. Preferably, an O-ring or other seal is used at such a connection for preventing leakage, such as a bleed passage O-ring 37. The second bleed passage 44 extending between a first end configured for fluid connection with the first bleed passage 144, and a second end configured for fluid connection with a second chamber 38.

Any suitable passageway can be used for the bleed line 94 and/or the pressure passageway 96, and a skilled artisan will be able to select an appropriate passageway (e.g., conduit, tubing, hose) for the connection in a particular embodiment based on various considerations, including the intended use of the fluid flow control valve, the intended environment within which the fluid flow control valve will be used, and the equipment and/or accessories with which the system 10 is intended to be used, among other considerations.

The fluid flow control valve 20 having a valve body portion 40. The fluid flow control valve 20 defining a main fluid flow passageway 73 extending through the valve body portion 40. The main fluid flow passageway 73 extending between an inlet orifice 34 and an outlet orifice 35.

The lower portion 41 having a housing 46. The housing 46 having an internal sidewall 47 having an upper rim 88, and an end wall 49 which defines an open topped cylinder in which at least a portion of a piston 50 is slidably received. The piston 50 having head 51 and an underside 53. The cylinder extending between a seat end and a dome end, and defined between a sidewall 47 and an end wall 49. The second chamber 38 defined between the underside 53 of the piston 50, the sidewall 47 and the end wall 49. A lower port 43 is defined through the end wall 49. The lower port 43 fluidly connecting the second chamber 38 with the bleed passage 44.

The piston 50 is reciprocable axially of the seat 42 within the cylinder. The piston 50 having head 51 and an underside 53. The head 51 having a sealing face 55. The piston 50 movable in-between a first position where the sealing face 55 engages the valve seat 42 thereby closing the main fluid flow passageway 73, and a second position where the sealing face 55 is not engaged with the valve seat 42 and wherein the main fluid flow passageway 73 is open. The sealing face 55 of the piston 50 sealing against the seat 42 serves as a shutoff valve within the fluid flow control valve 20. This shutoff valve interrupting the main fluid flow passageway 73 which extends from the orifice 34, through the first chamber 36, out the outlet orifice 35, out the lateral fluid flow passage 61 and into the container 6.

In the exemplary fluid flow control valve 20 illustrated in FIGS. 2 through 7, the sealing face 55 comprising an annular groove 48 for receiving therein a sealing member 77 therein. The sealing member 77 (e.g., O-rings, Teflon seals) for assisting in the creation of the mating seal against the seat 42. In other exemplary fluid flow control valves, such an annular groove/sealing member may not be present.

In the exemplary fluid flow control valve 20 illustrated in the Figures, the piston 50 having an external sidewall 56 having at least one annular sidewall groove 57 configured for receiving at least one sealing member 52 therein. The sealing member(s) 52 (e.g., O-rings, Teflon seals) sealing the piston external sidewall 56 to the housing internal sidewall 47. In other exemplary fluid flow control valves, such an annular groove/sealing member may not be present.

The second chamber 38 ("dome") defined between the underside 53 of the piston 50, the sidewall 47 and the end wall 49. The second chamber 38 adjacent the dome end. A lower port 43 fluidly connects the second chamber 38 with the bleed passage 44.

Extending from the housing 46 are a plurality of legs (particularly illustrated in FIGS. 4 and 6), preferably three legs (58, 58', 59), which connect with a collar 62 at a distal end. The collar 62 configured for connection to the valve body portion 40. In the exemplary fluid flow control valve 20 illustrated in FIGS. 2 through 7, this connection is via a plurality of screws 28 which extend through orifices in the collar 62 and into the upper portion 39 of the valve body portion 40.

Figure 6:
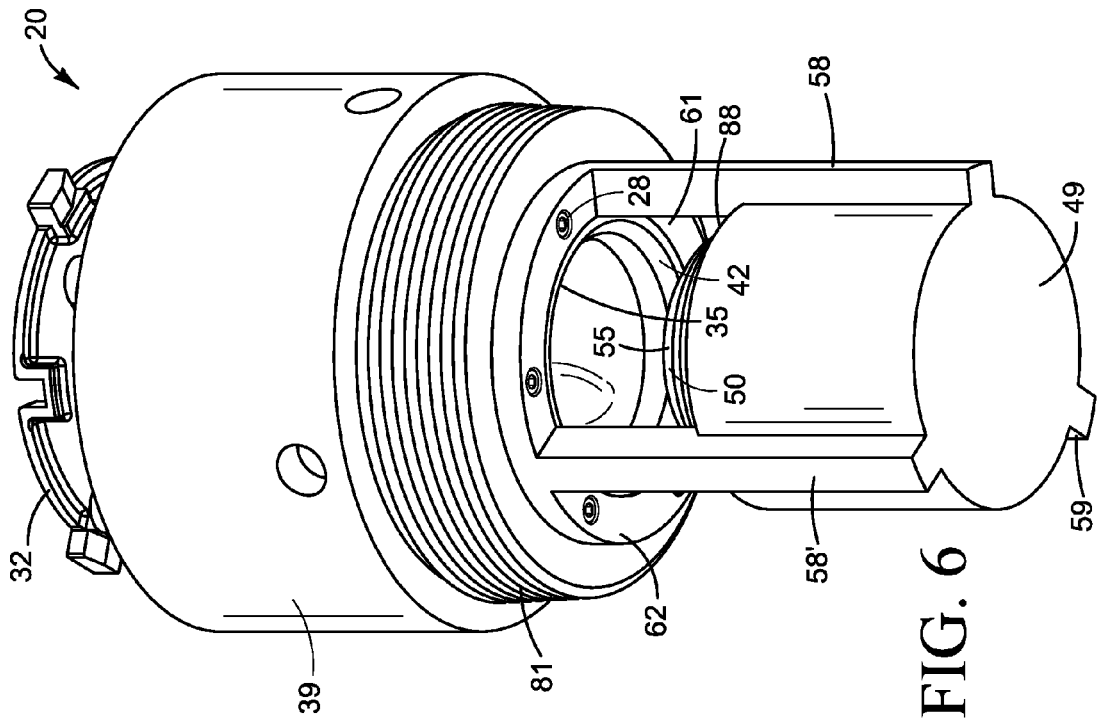
FIG. 6 is a perspective view of the first exemplary fluid flow control valve of FIG. 2, illustrated in its open position.
Figure 4:
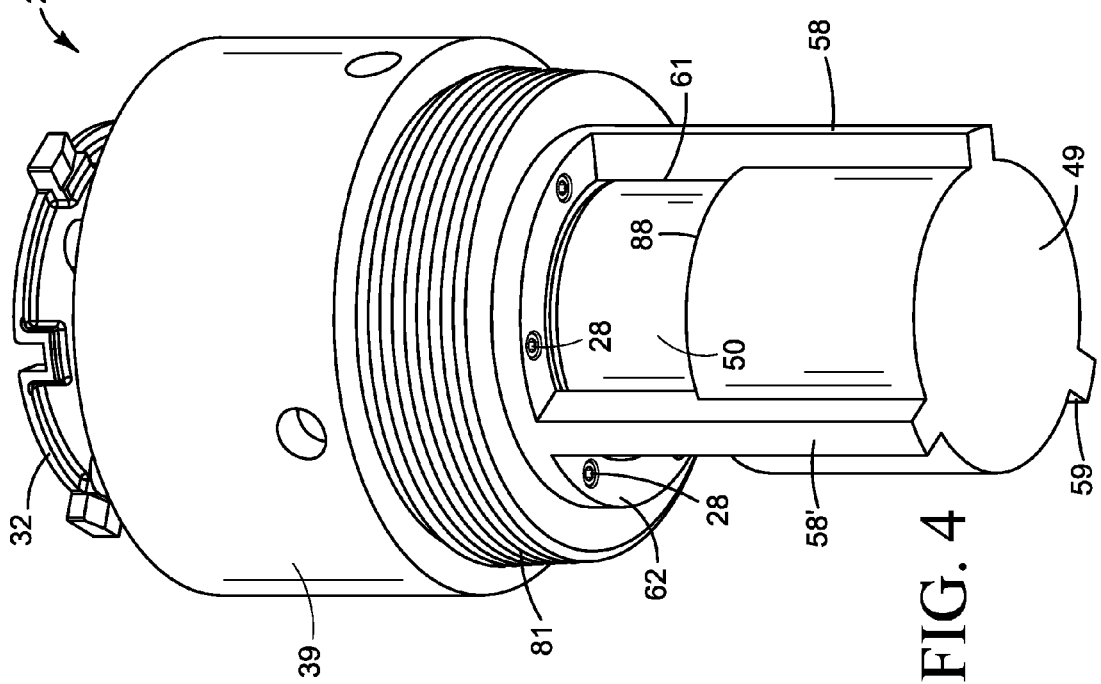
FIG. 4 is a perspective view of the first exemplary fluid flow control valve of FIG. 2, illustrated in its closed position.

The housing 46 defining at least one lateral fluid flow passage 61. As illustrated in FIGS. 4 and 6, three lateral fluid flow passages 61 are defined between the collar 62, adjacent legs (e.g., 58 and 59, 58 and 58', 58' and 59), and the rim 88 of the cylinder. The lateral fluid flow passages 61 for allowing fluid passing through the main fluid flow passageway 72 of the fluid flow control valve 20 to be conveyed into the container 6. The lateral fluid flow passages 61 can be best be seen in FIG. 6 as being open, and in FIG. 4 as being almost closed (the head 51 of the piston 50 almost sealing against the seat 42 (sealing would effectively close the lateral fluid flow passages 61)).

Figure 7:
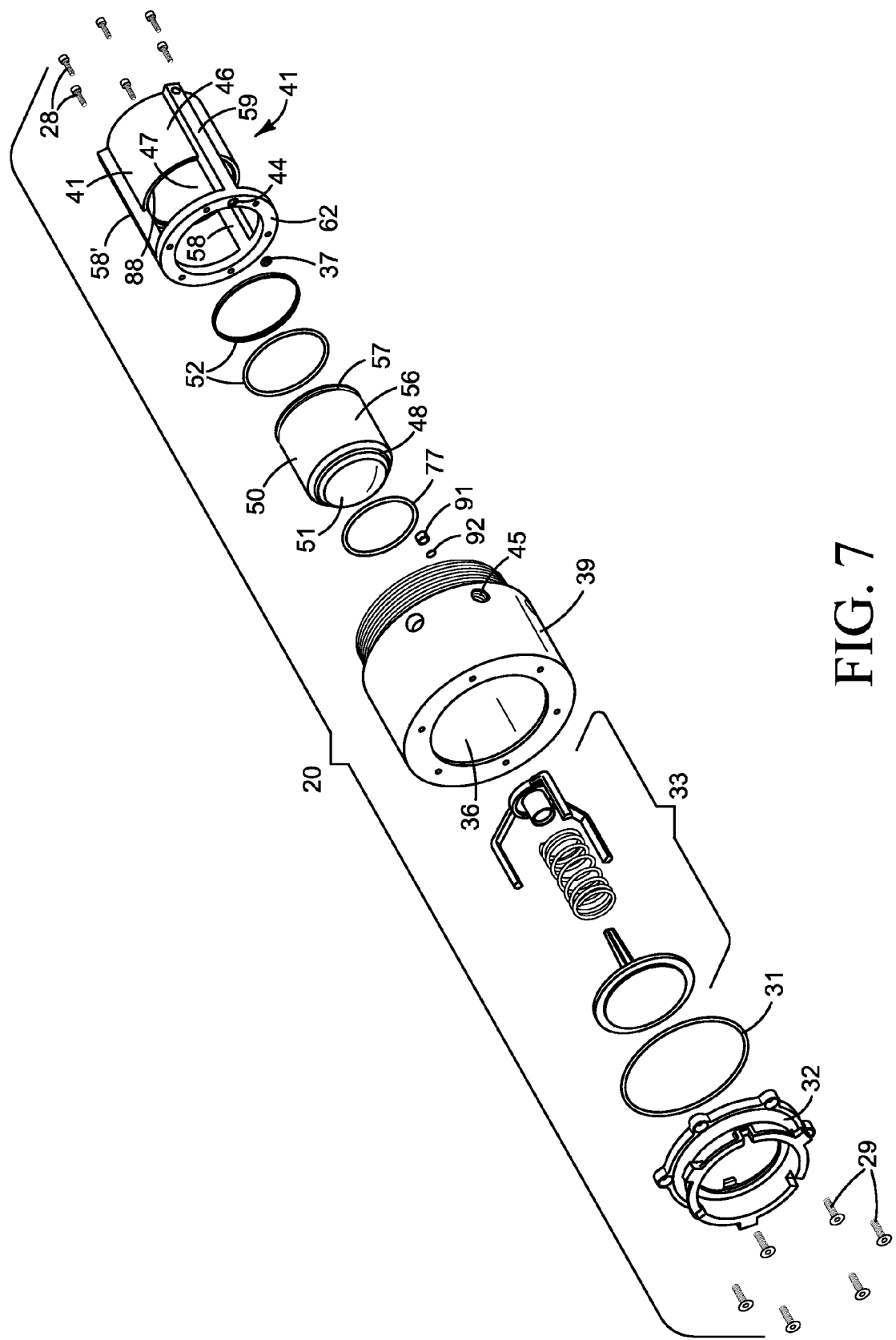
FIG. 7 is an exploded view of the first exemplary fluid flow control valve of FIG. 2.

In the exemplary fluid flow control valve 20 illustrated in FIGS. 2 through 7, the lower fluid bleed passage 44 extends through leg 59, as can be particularly seen in FIGS. 3, 5 and 7. As described above, the lower fluid bleed passage 44 is configured to fluidly align with the upper fluid bleed passage 144 (illustrated in FIGS. 3 and 5). A skilled artisan will be able to select an appropriate location and structure for the bleed passage(s) in a particular embodiment based on various considerations, including the intended use of the fluid flow control valve, the intended arena within which the fluid flow control valve will be used, and the equipment and/or accessories with which the fluid flow control valve is intended to be used, among other considerations.

FIGS. 3 and 4 illustrate the piston 50 in its closed position. When the piston 50 is in its closed position and the pilot valve 22 of the fluid level sensor 70 is in its closed position, the piston 50 remains in its closed position. When the piston 50 is in its closed position and the pilot valve 22 is in its open position, the piston 50 remains in its closed position until/unless a flow of fluid from the fluid conduit, through the dry disconnect receptacle (fluid source connector 32) and into the fluid flow control valve 20 is present. As illustrated in FIG. 3, if such a flow of fluid is present, the pressure (Pb) in the second chamber 38 is lower than the pressure (Pa) above the head of the piston 50, resulting in the piston 50 moving from its first (closed) position) to its second (open) position, open the fluid flow control valve 20 and permitting a flow of fluid from the fluid source, through the fluid flow control valve 20, and into the container.

FIGS. 5 and 6 illustrate that piston 50 in its open position. When the piston 50 is in its open position and the pilot valve 22 of the fluid level sensor 70 is in its open position, the pressure (Pb) in the second chamber 38 is lower than the pressure (Pa) above the head of the piston 50, resulting in the piston moving from its first (closed) position) to its second (open) position (or remaining in its second (open) position if it is already in that position).

FIGS. 5 and 6 illustrate the piston 50 in its open position. Upon sensing a fluid level 8 at or above a predetermined level, the sensor 80 causes the pilot valve 22 to close. The closure of the pilot valve 22 blocks the flow of bleed fluid from the first chamber 36 and/or second chamber 38 into the container 6. This causes static pressure to build in the bleed passage(s), and the fluid pressure (Pb) builds in the second chamber 38, causing the piston 50 to overcome the dynamic pressure (from the flow of fluid from the fluid source through the valve) and the piston 50 will begin to move towards the seat 42 of the first chamber 36. The fluid flow around the top of the piston 50 is dynamic (low), whereas the fluid pressure beneath the piston (in the second chamber 38) is static (high), resulting in the pressure (Pb) beneath the piston 50 being greater than the pressure (Pa) above the piston 50, causing the piston 50 to move from the open position to the closed position. As the face 55 of the piston 50 comes into contact with the seat 42 of the outlet orifice 35, the piston 50 moves into its closed position whereby the outlet orifice 35 is closed, resulting in the shutting off of the flow of fluid from the fluid source through the fluid flow control valve 20 and into the container 6.

FIGS. 3 and 4 illustrate the piston 50 in its closed position. When the piston 50 moves to the closed position, there is no flow around the top of the piston 50 any longer. This results in the fluid pressure (Pa) above the piston 50, and the fluid pressure (Pb) beneath the piston (in the second chamber 38) being generally the same. While the fluid pressures (Pa, Pb) are generally the same, the lower cross-sectional area (Ab) of the cylinder is greater than the upper cross-sectional area (Aa) of the outlet orifice 35. The net force (F) caused by the lower cross-sectional area (Ab) being more effective than the upper cross-sectional area (Aa) keeps the piston 50 in its closed position, sealing the outlet orifice 35 (as illustrated in FIGS. 3 and 4). Because of this difference in area and pressure, no spring is needed for biasing the piston's head against the seat.

Upon sensing a fluid level 8 below a predetermined level, the sensor 80 opens the pilot valve 22. If a flow of fluid from a fluid source is present, when the pilot valve 22 is open, bleed fluid is able to flow from the first chamber 36 and/or second chamber 38 of the fluid flow control valve 20 through the pilot valve 22 and into the container 6. The flow of bleed fluid decreases the fluid pressure (Pb) beneath the piston (in the second chamber 38), allowing the flow of fluid source through the fluid flow control valve 20 to move the piston 50 to its open position, permitting fluid to flow from the fluid source, through the fluid flow control valve, and into the container 6.

The fluid level sensor 70 comprising means for determining the fluid level in the container. In one exemplary refilling system 10, the fluid level sensor 70 comprises float valve, such as the generic float valve is illustrated in FIG. 2. A person having skill in the art would be able to choose a desired fluid level sensor based upon the application, environment, and other concerns. Examples of fluid level sensors include, but are not limited to, float valves and jet level sensors.

One benefit to the exemplary fluid flow control valve system is that the system is configured for "failing closed," meaning that should any of the components fail, the sensor will trigger the closure of pilot valve which will in turn trigger the closure of the pilot-operated fluid flow control valve, thereby preventing the over filling of the container, thereby decreasing the chances that the fluid will be spilled out of the container into the environment.

In another exemplary refilling system, the refilling system comprises a refueling system for large equipment (e.g., a locomotive), where the container comprises a fuel tank and the fluid comprises fuel.

Any suitable structure and/or material can be used for the components of the refueling system, and a skilled artisan will be able to select an appropriate structure and material for the components in a particular embodiment based on various considerations, including the intended use of the refueling system, the intended arena within which the refueling system will be used, and the equipment and/or accessories with which the refueling system is intended to be used, among other considerations.

Any suitable structure and/or material can be used for the components of the fluid flow control valve, and a skilled artisan will be able to select an appropriate structure and material for the components of the fluid flow control valve in a particular embodiment based on various considerations, including the intended use of the fluid flow control valve, the intended arena within which the fluid flow control valve will be used, and the equipment and/or accessories with which the fluid flow control valve is intended to be used, among other considerations. The inventor has determined that metals and plastics are considered suitable for use in the various components of the fluid flow control valve.

One exemplary method is a method of preparing a container for refilling with a fluid from a fluid source. The container having a first port and a second port. The refilling system comprising the steps of: installing a pilot-operated fluid flow control valve through the first port, the pilot-operated fluid flow control valve comprising a housing having a main fluid flow passageway extending from an inlet orifice to an outlet orifice, a valve closure element interrupting the main fluid flow passageway at a seat, a first chamber defined between the inlet orifice and the seat, the first chamber on a first side of the valve closure element, a second chamber defined on a second side of the valve closure element, the valve closure element able to move from a first position where the main fluid flow passageway is interrupted to a second position where the main fluid flow passageway is not interrupted; installing a fluid level sensor through the second port and into the container, the fluid level sensor comprising a pilot valve and a sensor, the fluid level sensor having a passageway there-through interrupted by the pilot valve (an interrupt valve), the passageway comprising an inlet and an outlet; and installing a bleed line fluidly connecting the first chamber and/or second chamber with the fluid level sensor passageway inlet.

It is noted that all structure and features of the various described and illustrated embodiments can be combined in any suitable configuration for inclusion in a fluid flow control valve according to a particular embodiment. For example, a fluid flow control valve according a particular embodiment can include or not include a filter, and/or a fluid flow control valve according a particular embodiment can include or not include a spring.

Any suitable materials can be used to form the various components of the fluid flow control valve, and a skilled artisan will be able to select appropriate materials for the various components of a fluid flow control valve according to a particular embodiment based on various considerations, including the fluid with which the fluid flow control valve is intended to be used, and the environment within which the fluid flow control valve is intended to be used. The inventor has determined that conventional polymeric and metal materials are suitable for use in the various components of the fluid flow control valve. For example, the fluid flow control valve and associated components can be injection-molded from suitable plastics known in the art. Alternatively, the fluid flow control valve and associated components can be formed from metal materials, including stainless steel and other suitable metals. Alternatively, some of the fluid flow control valve and associated components can be injection-molded from suitable plastics known in the art, whereas other of the fluid flow control valve and associated components can be formed from metal materials, including stainless steel and other suitable metals. Materials hereinafter discovered and/or developed that are determined to be suitable for use in fluid flow control valve devices would also be considered suitable for use in a fluid flow control valve according to a particular embodiment.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

I claim:

1. A refilling system for use in refilling a container with a fluid from a fluid source, said container having air space above a fluid space, said fluid having a fluid level within said container, said refilling system comprising:

a fluid flow control valve, said fluid flow control valve comprising a piston, a fluid source connector, an upper portion, a lower portion, an upper bleed port, a lower bleed port, an inlet port, a bleed passage, and at least one lateral fluid flow passage, wherein:

said fluid source connector connecting said fluid source to an upper portion inlet orifice;

said upper portion comprising said inlet orifice, an outlet orifice defining a seat, and a first chamber defined between said inlet orifice and said outlet orifice;

said piston having a head, said head configured for mating engagement with said seat, said piston movable from a closed position where said head engages said seat thereby closing said outlet orifice, to an open position where said head is not engaged with said seat thereby opening said outlet orifice;

said lower portion comprising a housing configured for receiving said piston therein, said housing having an internal sidewall defining an open topped cylinder having an end wall, said piston slidably received within said cylinder, the space within the cylinder between said end wall and said piston defining a second chamber, said lower portion further comprising said lower bleed port;

said inlet port defined in said fluid flow control valve;

said bleed passage extending from said inlet port to said lower bleed port, said bleed passage further extending to said upper bleed port;

said lower bleed port fluidly connected to said second chamber;

said upper bleed port fluidly connected to said first chamber; and said at least one lateral fluid flow passage is defined in said internal sidewall, said at least one lateral fluid flow passage for allowing fluid passing through the fluid flow control valve to be conveyed into the container, wherein said head sealing against said seat closes said at least one lateral fluid flow passage.

2. The refilling system of claim 1, wherein said head comprises a beveled edge for sealing engagement with said seat.

3. The refilling system of claim 1, wherein said lower bleed port fluidly connects to said second chamber.

4. The refilling system of claim 3, wherein said lower bleed port is defined through said end wall.

5. The refilling system of claim 1, further comprising a bleed line fluidly connecting the inlet port with a fluid level sensor.

6. The refilling system of claim 5, wherein said fluid level sensor comprises a sensor and a pilot valve, said pilot valve having an open position whereby when said fluid source connector connects said fluid source to said upper portion inlet orifice fluid is permitted to flow from said fluid flow control valve, through said bleed line, and through said fluid level sensor.

7. The refilling system of claim 6, wherein a fluid pressure difference between the first chamber and said second chamber moves the piston away from said seat, allowing said fluid to flow from the fluid source, through the inlet orifice, through the outlet orifice, through the lateral fluid flow passages and into said container.

8. The refilling system of claim 5, wherein said fluid level sensor comprises a sensor and a pilot valve, and wherein said pilot valve has a closed position whereby when said fluid source connector connects said fluid source to said upper portion inlet orifice fluid is prevented from flowing from said fluid flow control valve, through said bleed line, and through said fluid level sensor.

9. The refilling system of claim 8, wherein a fluid pressure difference between said first chamber and said second chamber moves the piston into sealing engagement with said seat, thereby blocking the flow of fluid from the fluid source, through the inlet orifice, through the outlet orifice, through the lateral fluid flow passages and into said container.

10. The refilling system of claim 1, further comprising a bleed line fluidly connecting the inlet port with a fluid level sensor comprising a pilot valve,
wherein said pilot valve has an open position whereby when said fluid source connector connects said fluid source to said upper portion inlet orifice fluid is permitted to flow from said fluid flow control valve, through said bleed line, and through said fluid level sensor, and wherein a fluid pressure difference between the first chamber and said second chamber moves the piston away from said seat, allowing said fluid to flow from the fluid source, through the inlet orifice, through the outlet orifice, through the lateral fluid flow passages and into said container,
wherein said pilot valve has a closed position, whereby when said fluid source connector connects said fluid source to said upper portion inlet orifice fluid is prevented from flowing from said fluid flow control valve, through said bleed line, and through said fluid level sensor, and wherein a fluid pressure difference between said first chamber and said second chamber moves the piston into sealing engagement with said seat, thereby blocking the flow of fluid from the fluid source, through the inlet orifice, through the outlet orifice, through the lateral fluid flow passages and into said container.

11. The refilling system of claim 1, further comprising a bleed line fluidly connecting the inlet port with a fluid level sensor, wherein said fluid level sensor comprises a sensor and a pilot valve, said pilot valve having an open position whereby when said fluid source connector connects said fluid source to said upper portion inlet orifice fluid is permitted to flow from said fluid flow control valve, through said bleed line, and through said fluid level sensor, and wherein said fluid level sensor comprises a sensor and a pilot valve, and wherein said pilot valve has a closed position whereby when said fluid source connector connects said fluid source to said upper portion inlet orifice fluid is prevented from flowing from said fluid flow control valve, through said bleed line, and through said fluid level sensor.

12. The refilling system of claim 11, wherein a fluid pressure difference between said first chamber and said second chamber moves the piston into sealing engagement with said seat, thereby blocking the flow of fluid from the fluid source, through the inlet orifice, through the outlet orifice, through the lateral fluid flow passages and into said container.

13. A refilling system for use in refilling a container with a fluid from a fluid source, said container having air space above a fluid space, said fluid having a fluid level within said container, said refilling system comprising:
a fluid flow control valve, said fluid flow control valve comprising a piston, a fluid source connector, an upper portion, a lower portion, an upper bleed port, a lower bleed port, an inlet port, a bleed passage, and at least one lateral fluid flow passage, wherein:
said fluid source connector connecting said fluid source to an upper portion inlet orifice;
said upper portion comprising said inlet orifice, an outlet orifice defining a seat, and a first chamber defined between said inlet orifice and said outlet orifice;
said piston having a head, said head configured for mating engagement with said seat, said piston movable from a closed position where said head engages said seat thereby closing said outlet orifice, to an open position where said head is not engaged with said seat thereby opening said outlet orifice;
said lower portion comprising a housing configured for receiving said piston therein, said housing having an internal sidewall defining an open topped cylinder having an end wall, said piston slidably received within said cylinder, the space within the cylinder between said end wall and said piston defining a second chamber, said lower portion further comprising said lower bleed port defined through said end wall;
said inlet port defined in said fluid flow control valve;
said bleed passage extending from said inlet port to said lower bleed port, said bleed passage further extending to said upper bleed port;
said lower bleed port fluidly connected to said second chamber;
said upper bleed port fluidly connected to said first chamber; and
said at least one lateral fluid flow passage is defined in said internal sidewall, said at least one lateral fluid flow passage for allowing fluid passing through the fluid flow control valve to be conveyed into the container, wherein said head sealing against said seat closes said at least one lateral fluid flow passage.

14. The refilling system of claim 13, wherein said head comprises a beveled edge for sealing engagement with said seat.

15. The refilling system of claim 14, further comprising a bleed line fluidly connecting the inlet port with a fluid level sensor.

16. The refilling system of claim 15, wherein said fluid level sensor comprises a sensor and a pilot valve, said pilot valve having an open position whereby when said fluid source connector connects said fluid source to said upper portion inlet orifice fluid can flow from said fluid flow control valve, through said bleed line, and through said fluid level sensor; and wherein a fluid pressure difference between the first chamber and said second chamber moves the piston away from said seat, allowing said fluid to flow from the fluid source, through the inlet orifice, through the outlet orifice, through the lateral fluid flow passages and into said container.

17. A refilling system for use in refilling a container with a fluid from a fluid source, said container having air space above a fluid space, said fluid having a fluid level within said container, said refilling system comprising:
a fluid flow control valve, said fluid flow control valve comprising a piston, a fluid source connector, an upper portion, a lower portion, an upper bleed port, a lower bleed port, an inlet port, a bleed passage, and at least one lateral fluid flow passage;
a bleed line fluidly connecting the inlet port with a fluid level sensor; and
said fluid level sensor;
wherein:
said fluid source connector connecting said fluid source to an upper portion inlet orifice;
said upper portion comprising said inlet orifice, an outlet orifice defining a seat, and a first chamber defined between said inlet orifice and said outlet orifice;

said piston having a head, said head configured for mating engagement with said seat, said piston movable from a closed position where said head engages said seat thereby closing said outlet orifice, to an open position where said head is not engaged with said seat thereby opening said outlet orifice;

said lower portion comprising a housing configured for receiving said piston therein, said housing having an internal sidewall defining an open topped cylinder having an end wall, said piston slidably received within said cylinder, the space within the cylinder between said end wall and said piston defining a second chamber, said lower portion further comprising said lower bleed port;

said inlet port defined in said fluid flow control valve;

said bleed passage extending from said inlet port to said lower bleed port, said bleed passage further extending to said upper bleed port;

said lower bleed port fluidly connected to said second chamber;

said upper bleed port fluidly connected to said first chamber;

said at least one lateral fluid flow passage is defined in said internal sidewall, said at least one lateral fluid flow passage for allowing fluid passing through the fluid flow control valve to be conveyed into the container, wherein said head sealing against said seat closes said at least one lateral fluid flow passage;

said fluid level sensor comprising a pilot valve and a sensor, said pilot valve having an open position whereby when said fluid source connector connects said fluid source to said upper portion inlet orifice fluid is permitted to flow from said fluid flow control valve, through said bleed line, and through said fluid level sensor and into said container, wherein a fluid pressure difference between the first chamber and said second chamber moves the piston away from said seat, allowing said fluid to flow from the fluid source, through the inlet orifice, through the outlet orifice, through the lateral fluid flow passages and into said container; and wherein said pilot valve has a closed position whereby when said fluid source connector connects said fluid source to said upper portion inlet orifice fluid is prevented from flowing from said fluid flow control valve, through said bleed line, and through said fluid level sensor, and wherein a fluid pressure difference between said first chamber and said second chamber moves the piston into sealing engagement with said seat, thereby blocking the flow of fluid from the fluid source, through the inlet orifice, through the outlet orifice, through the lateral fluid flow passages and into said container.

18. The refilling system of claim 17, wherein said head comprises a beveled edge for sealing engagement with said seat.

19. The refilling system of claim 17, wherein said lower bleed port fluidly connects to said second chamber.

20. The refilling system of claim 19, wherein said lower bleed port is defined through said end wall.

* * * * *